Lavender & Smith.
Steering.
Nº 14,104. Patented Jan. 15, 1856.
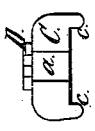
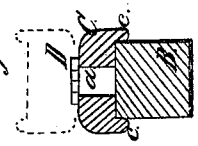
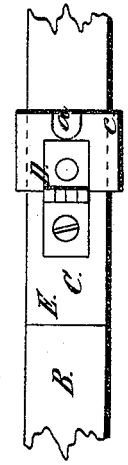
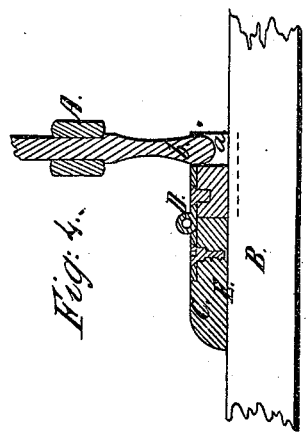
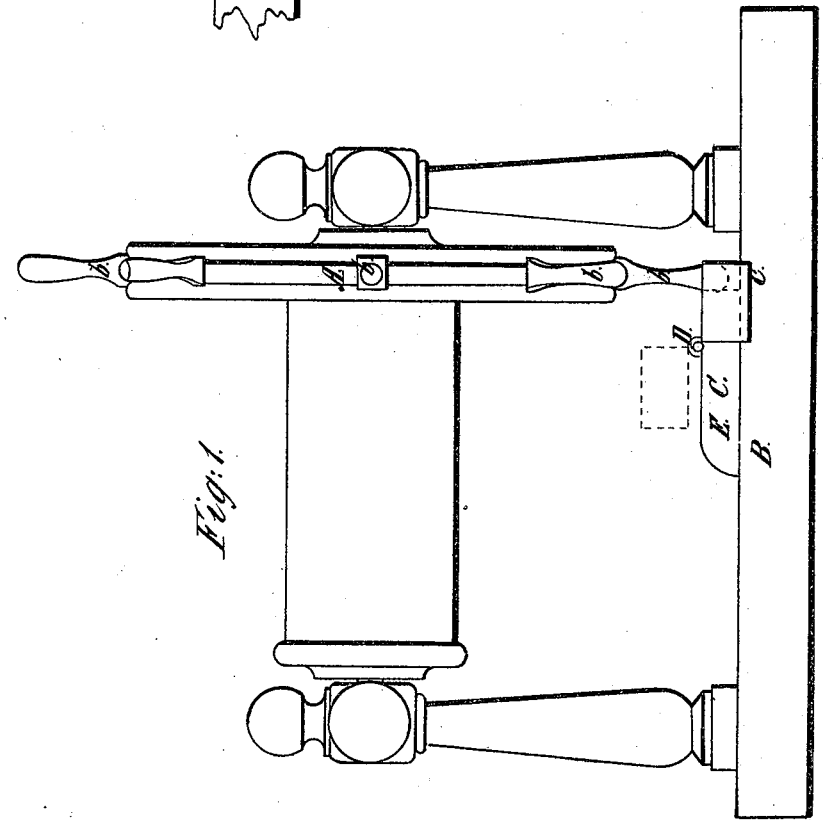

UNITED STATES PATENT OFFICE.

WILLIAM R. LAVENDER AND ATKINS SMITH, OF PROVINCETOWN, MASSACHUSETTS.

STEERING-WHEEL STOPPER.

Specification of Letters Patent No. 14,104, dated January 15, 1856.

*To all whom it may concern:*

Be it known that we, WILLIAM R. LAVENDER and ATKINS SMITH, of Provincetown, in the county of Barnstable and State of Massachusetts, have invented a new and useful Steering-Wheel Stopper; and we do hereby declare that the same is fully described and represented in the following specification and the accompanying drawings, of which—

Figure 1, exhibits a side elevation of a steering wheel and its tiller having our invention applied to them. Fig. 2, is a top view of the stopper. Fig. 3, a transverse of its movable portion. Fig. 4, a longitudinal section of the stopper and a part of the wheel. Fig. 5, a front view of the stopper.

In these drawings, A, represents the steering wheel constructed and applied to a tiller B, in the usual way.

C, is the stopper which consists of a block of wood or other suitable material, provided with a recess, *a*, for the reception of any one of the handles *b, b, b*, of the steering wheel, the said recess being arranged in the front side of the stopper. The lower part of the stopper is recessed out or formed with shoulders as seen at *c, c*, which when the stopper is turned down upon the tiller, project below the upper surface of it, and rest against its two sides and serve to relieve the hinge, D, from the strain of the wheel, when said wheel is held by the stopper. By means of such hinge, D, the stop is applied to a rising block, E, bolted firmly on the tiller as seen in the drawings, the hinge being arranged so that the stopper can be turned upward and out of engagement with the wheel, as represented by dotted lines in Figs. 1, and 3. The object of the stopper is to lock the wheel at such times as it may be necessary for the helmsman either to leave it or to relieve his arms from the strain of holding it, while the vessel to which it is applied is at sea. In order to accomplish this, we turn the stopper block downward, so as not only to cause it to embrace the lowermost handle of the wheel, but at the same time the tiller or support of the stopper. Until the stopper is turned back or upward into the position exhibited by dotted lines the wheel, A, will be held firmly so as to maintain the rudder at rest relatively to the ship.

What we claim is—

Constructing a wheel stopper and applying it so as to operate with the wheel and tiller substantially as specified, viz, so that it may turn up and down on a hinge and when down embrace the wheel handle and be supported laterally under the strain of the wheel by devices essentially as above described.

In testimony whereof, we have hereunto set our signatures this eighth day of December, A. D. 1855.

WILLIAM R. LAVENDER.
ATKINS SMITH.

Witnesses:
RUFUS L. THATCH,
STEPHEN RIEDER.